United States Patent [19]

Simmons

[11] 4,233,813
[45] Nov. 18, 1980

[54] OCEAN THERMAL ENGINE

[75] Inventor: Walter J. Simmons, Martinsburg, W. Va.

[73] Assignee: University of Delaware, Newark, Del.

[21] Appl. No.: 20,639

[22] Filed: Mar. 15, 1979

[51] Int. Cl.³ .............................................. F03G 7/06
[52] U.S. Cl. ....................................... 60/496; 60/641; 60/531
[58] Field of Search .......................... 60/496, 531, 641

[56] References Cited

U.S. PATENT DOCUMENTS

| | | | |
|---|---|---|---|
| 2,935,024 | 5/1960 | Kofahl | 60/496 X |
| 3,360,926 | 1/1968 | Parr | 60/496 |
| 3,715,885 | 2/1973 | Schur | 60/496 |
| 3,805,515 | 4/1974 | Zener | 60/641 |

Primary Examiner—Allen M. Ostrager

[57] ABSTRACT

An ocean thermal engine utilizing the thermocline and hydrostatic pressure of the ocean to change the buoyancy of a series of rigid containers having good thermal conductivity fitted with means for confining a thermodynamic fluid capable of vaporizing and condensing within the temperature range of the ocean thermocline. The rigid containers are arranged in spaced relation around rotatable supporting means so that the change in buoyancy of the containers causes said means to rotate and to drive a generator if electrical energy is desired.

4 Claims, 13 Drawing Figures

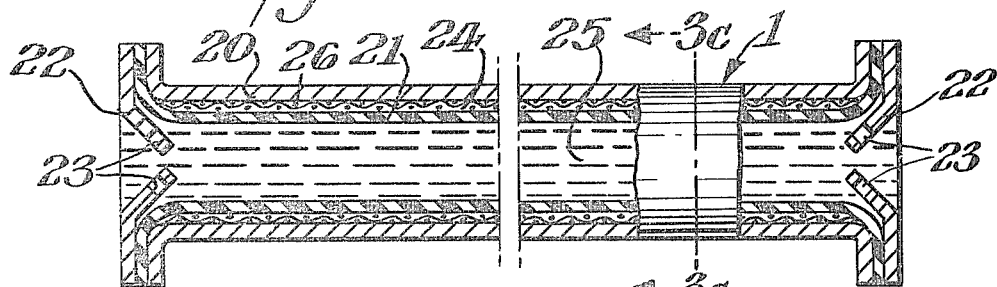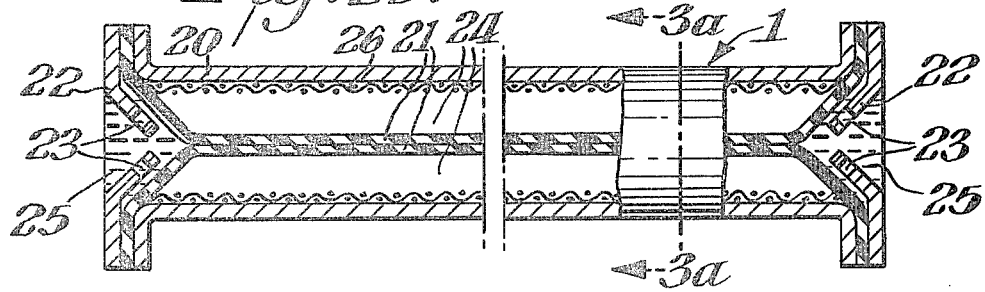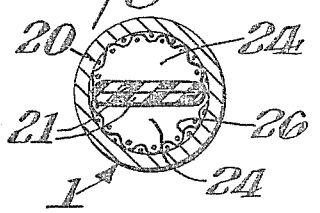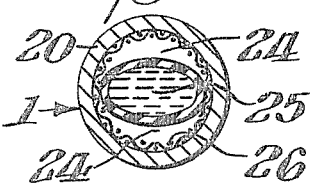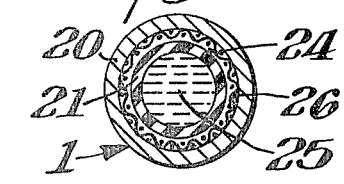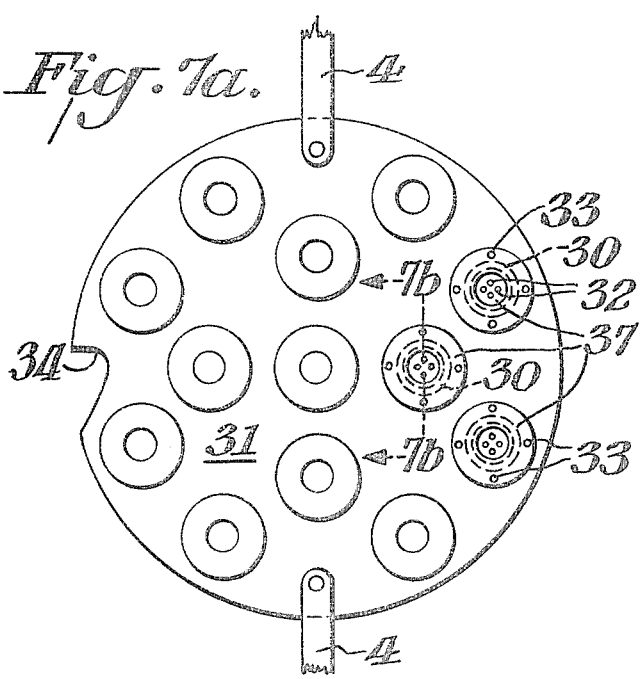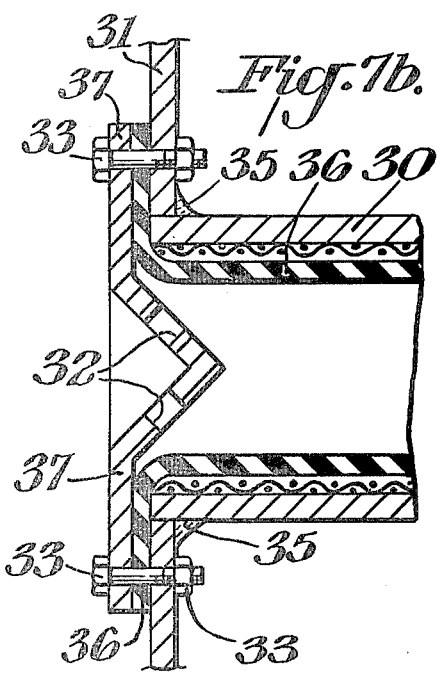

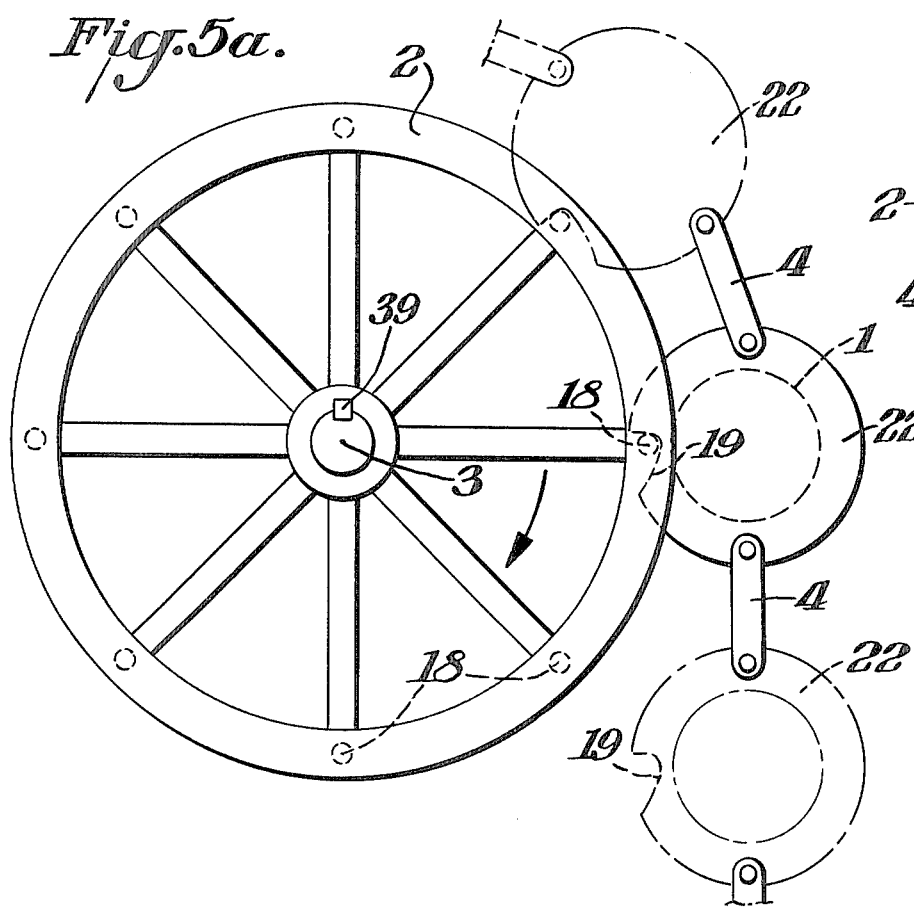
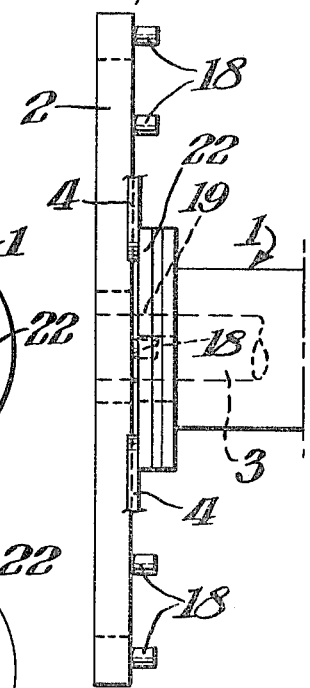
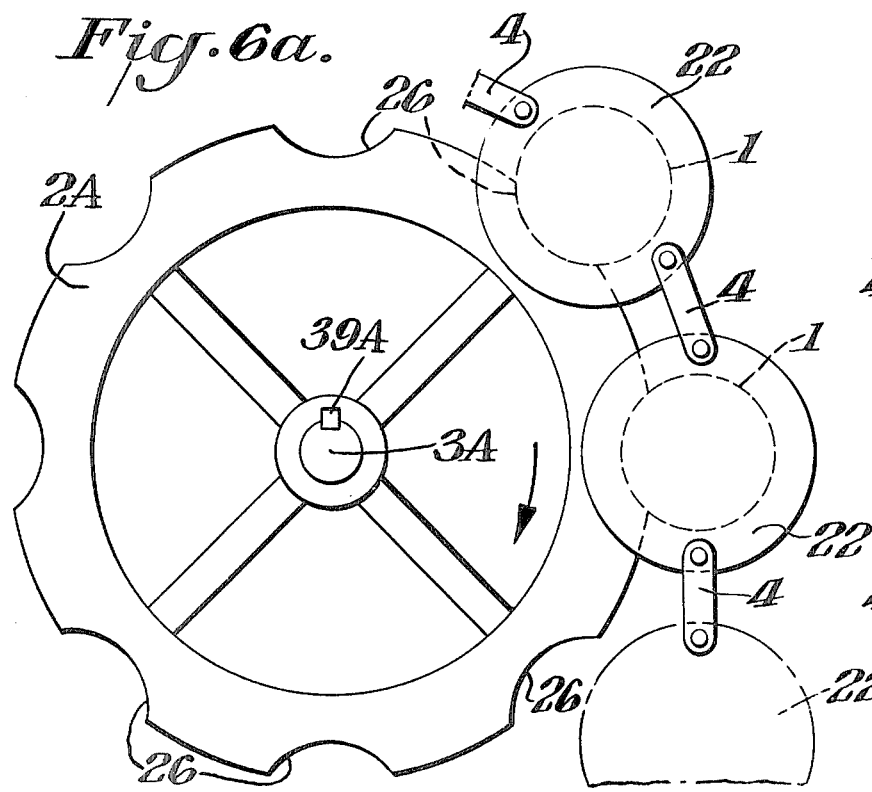
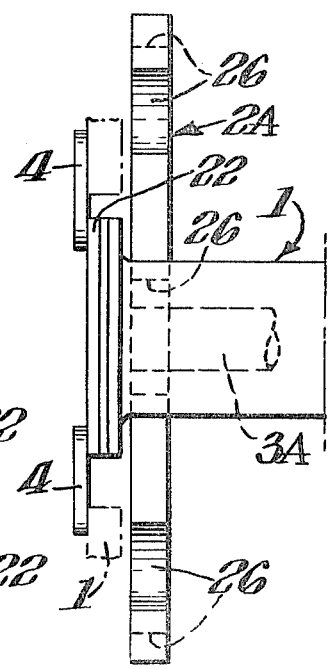

OCEAN THERMAL ENGINE

FIELD OF THE INVENTION

This invention relates to ocean thermal engines. More particularly it relates to such engines operated by a combination of the ocean thermocline, hydrostatic pressure, and a thermodynamic fluid to produce motion along a predetermined path to power a generator.

BACKGROUND OF THE INVENTION

A vast amount of energy is stored in the oceans and many ways have been proposed for utilizing this energy. Such methods include seawater batteries, floating wave generators, shore-based tidal dams and deepwater turbine platforms. Some also involve use of solar energy in combination with ocean thermal energy. Such ocean energy conversion systems are described by M. O. Zimmerman, Machine Design, Vol. 49, pp. 20–26, 1977, and C. Zener, Mechanical Engineering, Vol. 99, 26–29, 1977. A specific example of a power generation device utilizing the tropical water thermocline is described in U.S. Pat. No. 3,896,622 to G. T. Daniello. In this device a thermodynamic working fluid is vaporized by the warm surface water to raise a piston and the device is then lowered to the colder lower water where the working fluid is condensed and the falling piston does useful work. Another device utilizing a thermodynamic fluid is described in U.S. Pat. No. 3,984,985 to J. M. Lapeyre. This is a solar engine containing a relatively non-expandable fluid and a series of expandable and contractable chambers containing a thermodynamic fluid of lesser density than the non-expandable fluid. When the chambers are exposed to solar energy the thermodynamic fluid expands and forces the non-expandable fluid to the opposite side of the device where cooled chambers allow more non-expandable fluid to enter which causes a mechanical imbalance which in turn produces movement of the engine along a predetermined path.

In recent years studies of ocean thermal energy conversion have increased greatly and a large proportion of this effort has involved studies of heat exchangers, biofouling and corrosion. The heat exchanger component of an ocean thermal energy conversion power plant is the determining factor in achieving economic viability, since heat exchanger costs account for 40–60% of such a power plant costs.

It is an object of this invention to provide an efficient ocean thermal engine capable of utilizing the ocean thermocline.

Another object is to provide such an engine utilizing the hydrostatic pressure of the ocean.

A further object is to provide an ocean thermal engine in which the heat exchanger is combined with the engine.

A still further object is to provide an ocean thermal engine in which maintenance and cleaning costs associated with the fouling and corrosion of heat exchangers subjected to seawater are held to a minimum.

SUMMARY OF THE INVENTION

This invention provides an ocean thermal engine comprising a series of rigid containers disposed in spaced relation to form an endless chain, rotatable supporting means for suspending said endless chain substantially vertical, open ducts through which the two vertical lengths of the chain of containers extend, means for circulating seawater from near the surface through one duct and means for circulating colder seawater through the other duct, each container having means for confining a thermodynamic fluid, said thermodynamic fluid being capable of vaporizing within the temperature range of the seawater in said first duct and condensing within the temperature range of the seawater in said second duct, said means effecting discharge of seawater from the container upon vaporization of the fluid and intake of seawater upon condensation of the fluid, thereby effecting a change in buoyancy of the containers and their movement through said ducts, and means for recovering useful power from the movement of said chain.

Preferably the invention provides an ocean thermal engine comprising a series of rigid containers or grouped containers disposed in spaced relation around upper and lower rotatable supporting means permitting the containers or said group to move continually around the two supporting means. Each container is fitted with a relatively expandable and contractable chamber which is charged with a thermodynamic fluid. Openings at the ends of the containers allow seawater to flow into and out of them. A predetermined number of the upper containers are enclosed by a duct in which warm surface water is circulated and a corresponding series of containers on the opposite side are enclosed by a duct in which cold water from a deeper part of the ocean is circulated. The vaporization of the thermodynamic fluid in the expandable chambers causes displacement of the seawater in the center of the containers. At the same time the chambers in the containers exposed to cold water contract due to condensation of the vapor therein, and this allows cold seawater to enter these containers. As a result the cooled series of containers contain a greater amount of seawater than the warmed series of containers and this causes an imbalance in buoyancy of the two series of containers. This in turn causes the warm containers to rise and rotate the upper supporting means which is connected by gears to a generator. As the cooled containers descend the hydrostatic pressure of the ocean increases and this augments the condensation of the thermodynamic fluid in them. The lower supporting means acts as a guide for the revolving series of containers.

DESCRIPTION OF THE PREFERRED EMBODIMENT

This invention will be more fully understood from the following detailed description for carrying out the invention taken in conjunction with the accompanying drawings in which:

FIG. 1 is a cross-sectional end elevational view of one embodiment of an ocean thermal engine of this invention in which the rigid containers are round metal tubes;

FIG. 2, a and b, show in sectional side elevational views one of the tubes of this invention. FIG. 2a shows the tube when the thermodynamic fluid in it is condensed and the tube is at minimum buoyancy. FIG. 2b shows the same tube at maximum buoyancy when the flexible sleeve is expanded by the vaporized thermodynamic fluid contained in it;

FIG. 3a is a cross-sectional end view taken through FIG. 2b along line 3a—3a showing the tube at maximum buoyancy; FIG. 3b is a cross-sectional end view showing the tube at intermediate buoyancy; and FIG. 3c is a cross-sectional end view taken through FIG. 2a along line 3c—3c showing the tube at minumum buoyancy.

Figure 1:
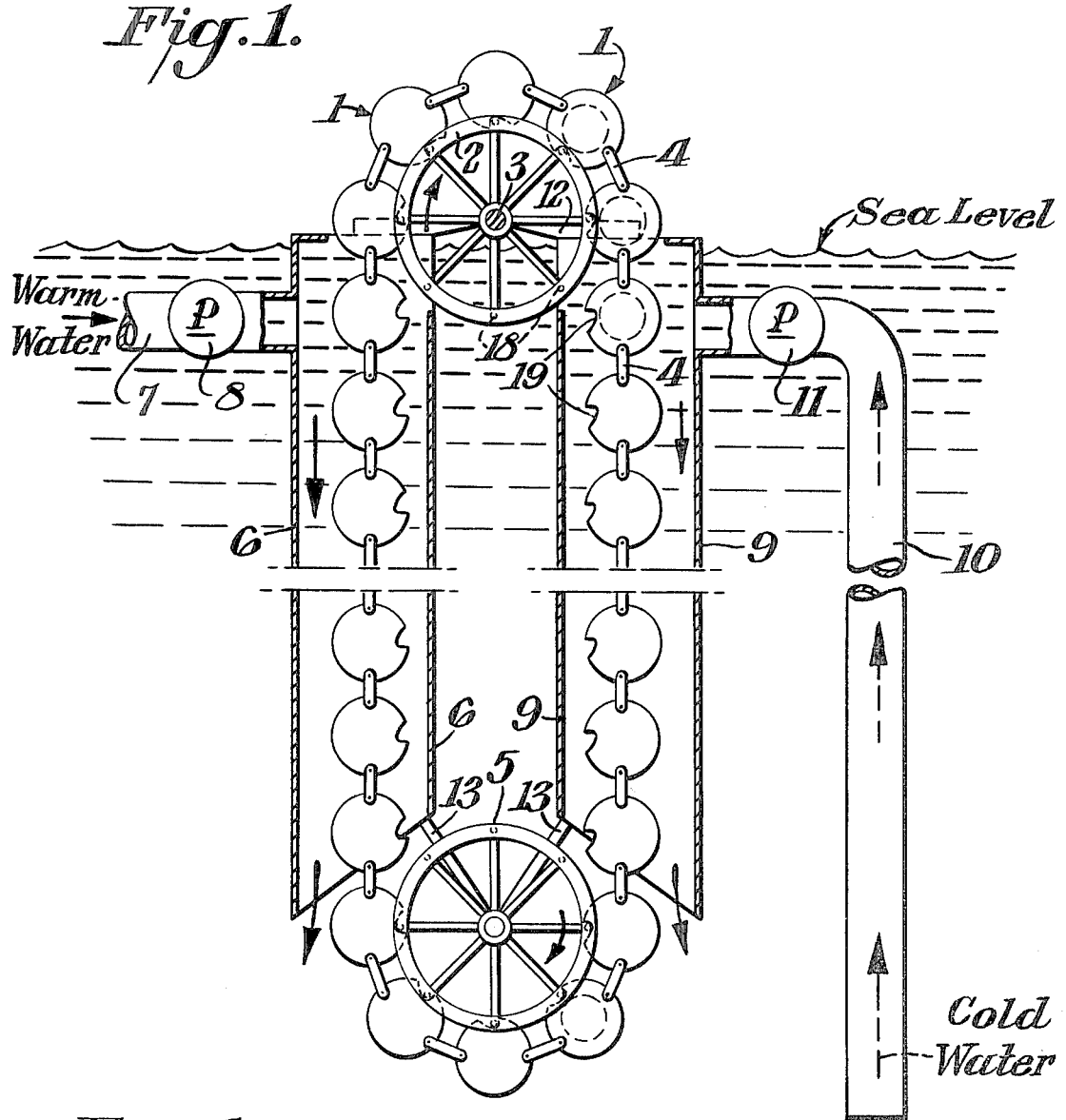

FIG. 5, a and b, show in detail a method for connecting the rigid containers to the rotatable wheels in the ocean thermal engine similar to the engine of FIG. 1. FIG. 5a is an end elevational view of one of the tubes connected to the supporting wheel; FIG. 5b is a side elevational view of part of a tube connected to the supporting wheel shown in FIG. 5a.

FIG. 6, a and b, show another method of supporting the tubes on the rotatable supporting wheels. FIG. 6a is an end elevational view and FIG. 6b is a side elevational view of part of a tube resting on the rotatable wheel.

FIG. 7, a and b, show still another embodiment of the invention in which a large heat exchanger tube is replaced by several smaller tubes. FIG. 7a is an end elevational view of an assembly of 13 small tubes attached to an end plate which is supported on the rotatable wheels of the ocean thermal engine; and FIG. 7b is an enlarged cross-sectional elevational view taken through FIG. 7a along line 7b—7b showing part of one of the small tubes attached to the end plate.

DETAILED DESCRIPTION OF THE INVENTION

Referring to FIG. 1 there is shown an embodiment of this invention in which the rigid containers are horizontal round metal tubes. In this embodiment a series of long metal tubes 1 are supported at their ends by notches 19 that mesh with lugs 18 on the sides of a pair of wheels 2 keyed to axle 3. The tubes are spaced evenly apart by metal links 4 as in a roller chain. The revolving metal tubes are connected via said chains to a pair of lower wheels 5 which serve as guides, and which have similar lugs that mesh with the notches on the ends of the tubes. A number of tubes on one side of the supporting wheels are enclosed by a vertical duct 6 into which warm surface water is circulated at inlet 7 by means of pump 8. This circulating warm seawater is forced out of the lower end of duct 6. The series of tubes on the opposite side of the wheels are enclosed by duct 9 into which cold water from the ocean bottom is pumped through pipe 10 by means of pump 11. Pumps 8 and 11 can be of any type capable of circulating the seawater at the desired rate. For example, centrifugal or propeller pumps are suitable. This circulating cold water is forced out of duct 9 at its lower end. The direction of circulation of the warm and cold water through the ducts is indicated by the arrows in the various ducts. Alternatively, the warm surface water can be pumped into the lower end of the warm water duct 6 in order to cause the water to flow in the same direction as the ascending tubes. In this case the open area at the bottom of the duct can be restricted sufficiently to allow the tubes to move freely into the duct but to cause the effluent water to flow out the top of the duct. This embodiment reduces the drag on the ascending tubes, however, better heat transfer to the heat exchanger tubes is obtained when the tubes are moving in counter-current fashion. The upper and lower wheels of the engine are supported by suitable means 12 and 13 to the ducts 6 and 9. The warmed tubes are more buoyant than the cooled tubes and this imbalance causes the warmed tubes to rise and the cooled tubes to descend, with this movement causing the upper wheels to rotate. The rotating upper wheels provide power to operate a generator (not shown) connected to the axle of these wheels. The direction of rotation of the supporting wheels is shown by arrows drawn on FIG. 1.

In another embodiment, part of the heating or cooling water can be introduced into the ducts by jets of water impinging on the moving containers. While the exact number of horizontal containers moving around the support wheels is not critical, it is essential to use a number sufficient to produce a substantial difference in buoyancy between the ascending and descending containers.

Further details of the structure of the metal tubes shown in FIG. 1 are given in FIG. 2a and 2b. In these drawings the rigid metal container is a round metal tube 20. Inside this tube is a flexible elastomeric sleeve 21 which is sealed at each end of the tube by a metal retaining disc 22 having openings 23 in the center to allow seawater to flow into and out of the center of the tube, but to prevent loss of thermodynamic fluid 24 from the space between the metal tube 20 and the elastomeric sleeve 21. FIG. 2a shows the heat exchanger tube of this invention at the state when it is a minimum buoyancy, i.e. with the thermodynamic fluid condensed to a liquid between the collapsed elastomeric sleeve and the metal tube and seawater 25 filling the center of the tube. FIG. 2b shows the tube at maximum buoyancy, i.e. with the thermodynamic fluid vaporized and the seawater expelled from the center of the tube.

Since the liquid thermodynamic fluid tends to collect in a small area on the bottom of large tubes and thus greatly reduce the heat exchanger area, it is preferred to attach a wicking member 26 to the inside of the metal tubes.

FIG. 3 gives sectional end views of the tube 20 of FIG. 2 at its center. In these drawings FIG. 3a shows the tube 20 at maximum buoyancy with the thermodynamic fluid 24 vaporized and the seawater 25 expelled from the center of the sleeve 21. FIG. 3b shows the tube 20 at intermediate buoyancy. FIG. 3c shows the tube 20 at minimum buoyancy where the thermodynamic fluid 24 is condensed in the wicking member 26, the elastomeric sleeve 21 is contracted and seawater 25 fills the center of the sleeve.

Figure 4:
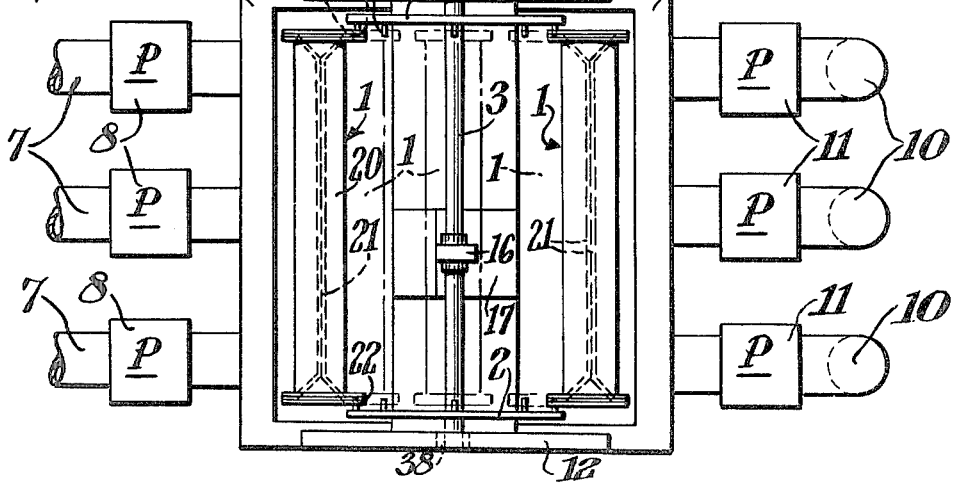
FIG. 4 is a schematic top plan view of the top of the engine illustrated in FIG. 1.

A schematic plan view of part of the top of the ocean thermal engine of FIG. 1 is shown in FIG. 4. This drawing shows the elastomeric sleeve 21 in broken line representation in the elongated metal tube 1 having maximum buoyancy as it leaves the warming duct 6. Inlets for warm surface water are shown at 7. The ends of tube 1 are attached to wheels 2 having axle and drive shaft 3 journaled on bearings 38 mounted in the supports 12 which are attached to ducts 6 and 9 (not shown in FIG. 4). The rotating axle 3 is connected through step-up gears 16 to a generator placed in a suitable location, such as at supporting platform 17.

Details of a method of supporting the tubes 1 on the rotatable wheels 2 of the ocean thermal engine of FIG. 1 are given in FIGS. 5a and 5b. FIG. 5a is an end elevational view of one of the metal tubes 1 fitted onto a lug 18 (attached near the outer edge of wheel 2) by means of engagement of a notch 19 in the circumference of retaining disc 22. This arrangement allows the ascending tubes to rotate the supporting wheels 2 in the direction shown by the arrow in FIG. 5a. Wheels 2 are keyed to axle 3 by key 39. FIG 5b is a side elevational view of part of tube 1 where it is fitted at notch 19 onto the lug 18 on wheel 2.

Another type of supporting means for the ocean thermal engine of this invention is illustrated in FIGS. 6a and 6b. In this embodiment circular depressions 26 are cut into the circumference of the supporting wheels 2A which are keyed to axle 3A by key 39A. These depressions are in the form of an arc having the same radius as that of the outside of the heat exchanger tubes 1. This permits the tubes to fit snugly into the depressions so as to rotate the wheels as the chain of tubes rises through the warm water duct. As in the previous Figures the metal tubes 1 are spaced apart by metal links 4 so that they fit into the depressions 26. The flanges 22 on the ends of the heat exchanger tubes 1 are positioned outside the pair of supporting wheels 2A to prevent the tubes 1 from sliding off the wheels. The depressions on the circumference of the wheels are cut deep enough to keep the chain of tubes in contact with the wheels when they are rotated.

The horsepower generated by the engine of this invention is dependent on the change in buoyancy of the containers and the velocity at which they move. The power required to move the containers through the water must be subtracted from the theoretical power. For each size and shape of container there is an optimum velocity. In the case of horizontal, rigid tubes the horsepower increases in proportion to the velocity and the drag increases in proportion to the velocity squared. The approximate horsepower, as a function of diameter of the tube, is given by the formula $$[-C_D \rho v^2 DL + 8D^2 L\pi](V/550)$$

The approximate velocity at which this maximum horsepower is developed is calculated by the formula
$$V = \sqrt{4.6D}$$

Where
V = velocity (ft./sec)
$C_D$ = drag coefficient
D = diameter of pipe (ft.)
L = length of pipe (ft.)
$\rho$ = lb. mass/ft.$^2$ Heat transfer into the tubes becomes a limiting factor on horsepower for single tubes above 2 to 3 ft. in diameter. In view of this, the heat transfer can be improved by using large bundles of smaller tubes for each single tube shown in the drawings. This embodiment is illustrated in FIGS. 7a and 7b. FIG. 7a is a schematic end elevational view of an assembly of thirteen heat exchanger tubes 30 attached to metal end plate 31. The end plate contains openings 32 which allow seawater to flow into and out of the tubes 30. The tubes 30 are welded to the end plate 31. The particular embodiment illustrated in FIG. 7a is connected by notch 34 to a lug on the rotatable support wheel as shown in FIGS. 5a and 5b. Each assembly of multiple tubes is spaced apart by metal links 4 so that each assembly is supported on the rotatable wheel in the manner shown in FIG. 1. FIG. 7b is a cross-sectional view of FIG. 7a taken along line 7b—7b showing details of the attachment of a single tube 30 to the end plate 31. Tube 30 is welded to end plate 31 at point 35. The elastomeric sleeve 36 extends past the end of the tube and is sealed to the end plate by retaining disc 37 which is bolted to the end plate 31 by bolts 33.

In the description of the preferred embodiment given above the horizontal rigid, elongated containers which serve as heat exchangers in the ocean thermal engine of this invention have been specified as round metal tubes. However this invention is not limited to this type specifically. Other shapes of containers such as those having oval, square, or triangular cross-sections can be used. The metal used for construction of the containers can be any metal resistant to corrosion by seawater. For example, containers of aluminum, titanium-clad steel, stainless steel or monel metal are suitable. Alternatively, containers made of any rigid, reinforced plastic material having good heat transmission properties can be used.

The material of construction for the inner flexible sleeve in the container of this invention is preferably elastomeric material. However, any flexible polymeric material inpervious to seawater and to the thermodynamic fluid employed can be used for the sleeves. Examples of such materials include polyesters, polyester elastomers, polyolefins, and the nylons, or combinations of these.

The halofluorocarbons known commercially as "Freon"s are preferred thermodynamic fluids for use in the ocean thermal engines of this invention. The particular halofluorocarbon employed depends on its boiling point and the temperature range of the ocean thermocline in which the engine is to be operated. Specific halofluorocarbons that can be used include dichlorodifluoromethane, trichloromonofluoromethane, dichloromonofluoromethane and dichlorotetrafluoroethane. The particular halofluorocarbon selected for use is also dependent on the hydrostatic pressure of the ocean at the depth the engine is designed to be operated. The vapor pressure characteristics of the halofluorocarbon should be carefully matched with the ambient pressure and temperature conditions of the ocean.

For example, when dichlorodifluoromethane is used as the thermodynamic fluid, the tubes in the cold duct will obtain minimum buoyancy at a relatively shallow depth of 75 ft. at a temperature of 40° F. The tubes in the warm duct will be at minimum buoyancy only below depths of 150 ft. if the hydroflurocarbon is at 75° F. Thus the tubes in the warm duct will be buoyant for approximately 75 more feet then they are in the cold duct. It is this difference in the number of buoyant tubes that drives the engine. Thus tubes containing dichlorodifluoromethane would be used at operating depths between 70 and 170 feet. When chlorodifluoromethane is employed as the thermodynamic fluid the difference in height of buoyant tubes in the cold and warm ducts would be 135 ft. Thus tubes containing this material would be used at depths ranging from 130 to 270 feet.

If desired, ammonia can be used as the thermodynamic fluid at appropriate ocean temperatures and pressures. Using this material the operating depth of the tubes would range from 110 ft. to 160 ft.

The ocean thermal engines of this invention can be supported on floating platforms of various designs, the only requirement for the platform being its ability to support the complete thermal engine at the desired level in the ocean. Many such platforms could be arranged in a circle or other formations with one common warm water tube and one common cold water tube to supply the engines with the proper amounts of water.

An optional modification of this invention includes the use of solar energy to increase the temperature of the surface water being circulated through the warm water duct. Conventional solar heating systems can be mounted on the engine supporting platform for this purpose.

The ocean thermal engine of this invention exhibits a number of advantages, among which are the following:

The heat exchanger containers act as an engine. The buoyancy change of the heat exchangers drives the supporting wheel. Thus no expensive low pressure gas turbines found in other thermal engines are required.

A leak in one of the heat exchanger containers does not disable the entire system. A leak in one tube is inconsequential. The leaking tube can be repaired or replaced rapidly with no effect on neighboring tubes.

The engine of the present invention requires no rotating seals, since the working thermodynamic fluid is sealed in the heat exchanger tubes.

No pumps are required to transfer the thermodynamic fluid from the condenser to the boiler, as is required in other types of engines.

The heat exchanger tubes are easily cleaned. Since the tubes come to the surface every several minutes they can be automatically cleaned periodically. Also since the temperature of heat exchanger tubes fluctuate over an appreciable range, e.g. from 5° to 26° C., every few minutes, marine growth on the containers will be inhibited.

It is apparent that changes and modifications may be made herein without departing from the invention in its broadest aspects. The aim of the appended claims therefore is to cover all such changes and modifications as fall within the true spirit and scope of the invention.

I claim:
1. An ocean thermal engine comprising
   a. a series of rigid containers disposed in spaced relation to form an endless chain;
   b. rotatable supporting means for suspending said endless chain substantially vertical;
   c. open ducts through which the two vertical lengths of the chain of containers extend;
   d. means for circulating seawater from near the surface through one duct and means for circulating colder seawater through the other duct;
   e. each container having means for confining a thermodynamic fluid, said thermodynamic fluid being capable of vaporizing within the temperature range of the seawater in said first duct and condensing within the temperature range of the seawater in said second duct, said means effecting discharge of seawater from the container upon vaporization of the fluid and intake of seawater upon condensation of the fluid, thereby effecting a change in buoyancy of the containers and their movement through said ducts;
   f. means for recovering useful power from the movement of said chain.

2. An ocean thermal engine of claim 1 wherein said rigid containers are elongated metal cylinders having an elastomeric sleeve confining said thermodynamic fluid.

3. An ocean thermal engine of claim 2 wherein the elastomeric sleeve extends throughout the interior of the metal cylinder and the ends of the sleeve are sealed to the ends of the cylinder so as to confine the thermodynamic fluid between the exterior surface of the sleeve and the interior wall of the cylinder and to permit seawater to enter the bore of the sleeve.

4. An ocean thermal engine of claim 3 wherein there is a coating of a wicking material for the thermodynamic fluid on the interior wall of the cylinder.

* * * * *